Dec. 18, 1962 R. H. SCHULTZ ET AL 3,068,731
SHEARING APPARATUS HAVING ROTARY BEARING
MEANS TO PREDETERMINE THE AMOUNT OF
OVERLAP OF ROTARY BLADES
Filed April 6, 1956 4 Sheets-Sheet 1
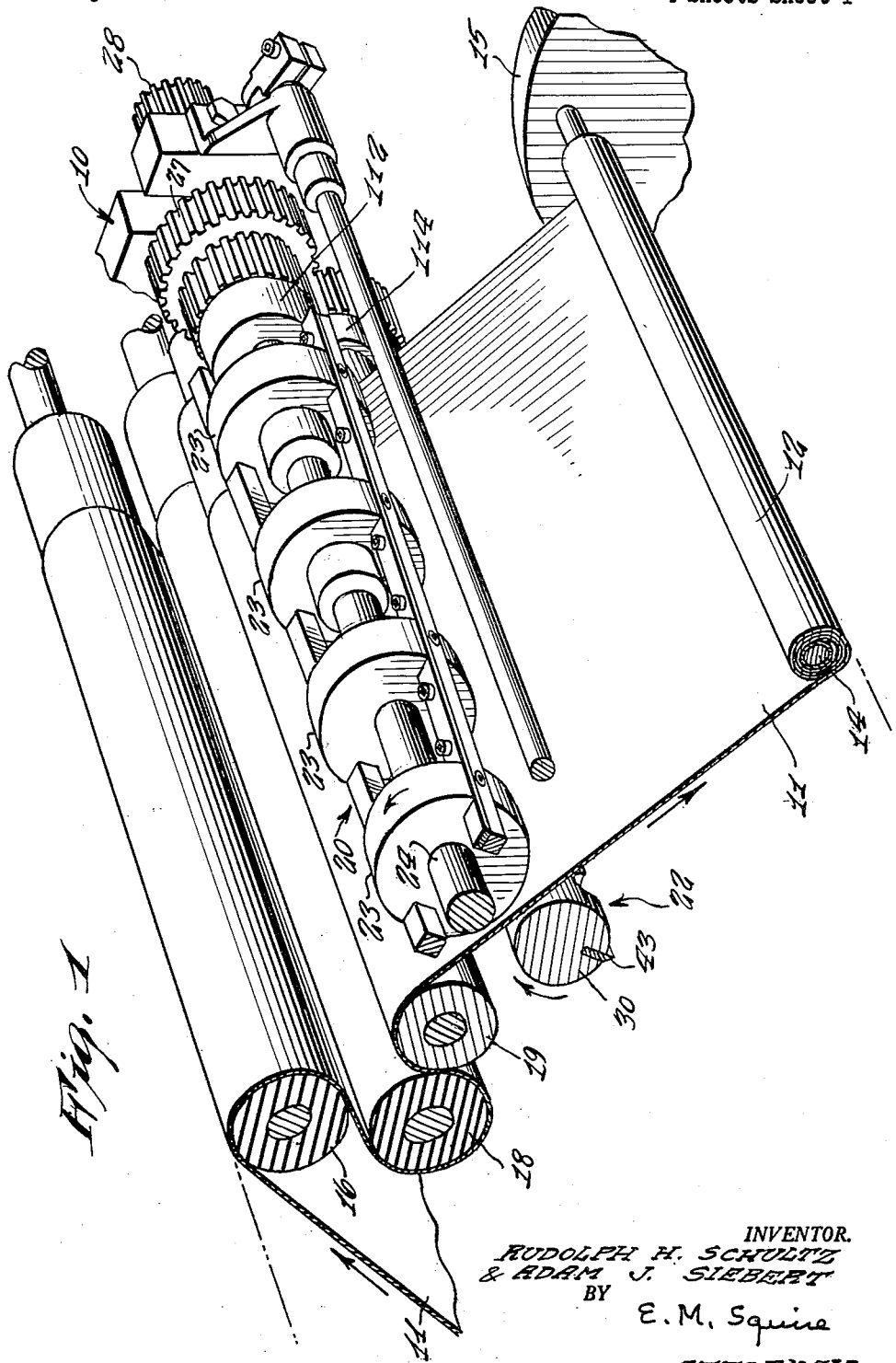
INVENTOR.
RUDOLPH H. SCHULTZ
& ADAM J. SIEBERT
BY
E. M. Squire
ATTORNEY

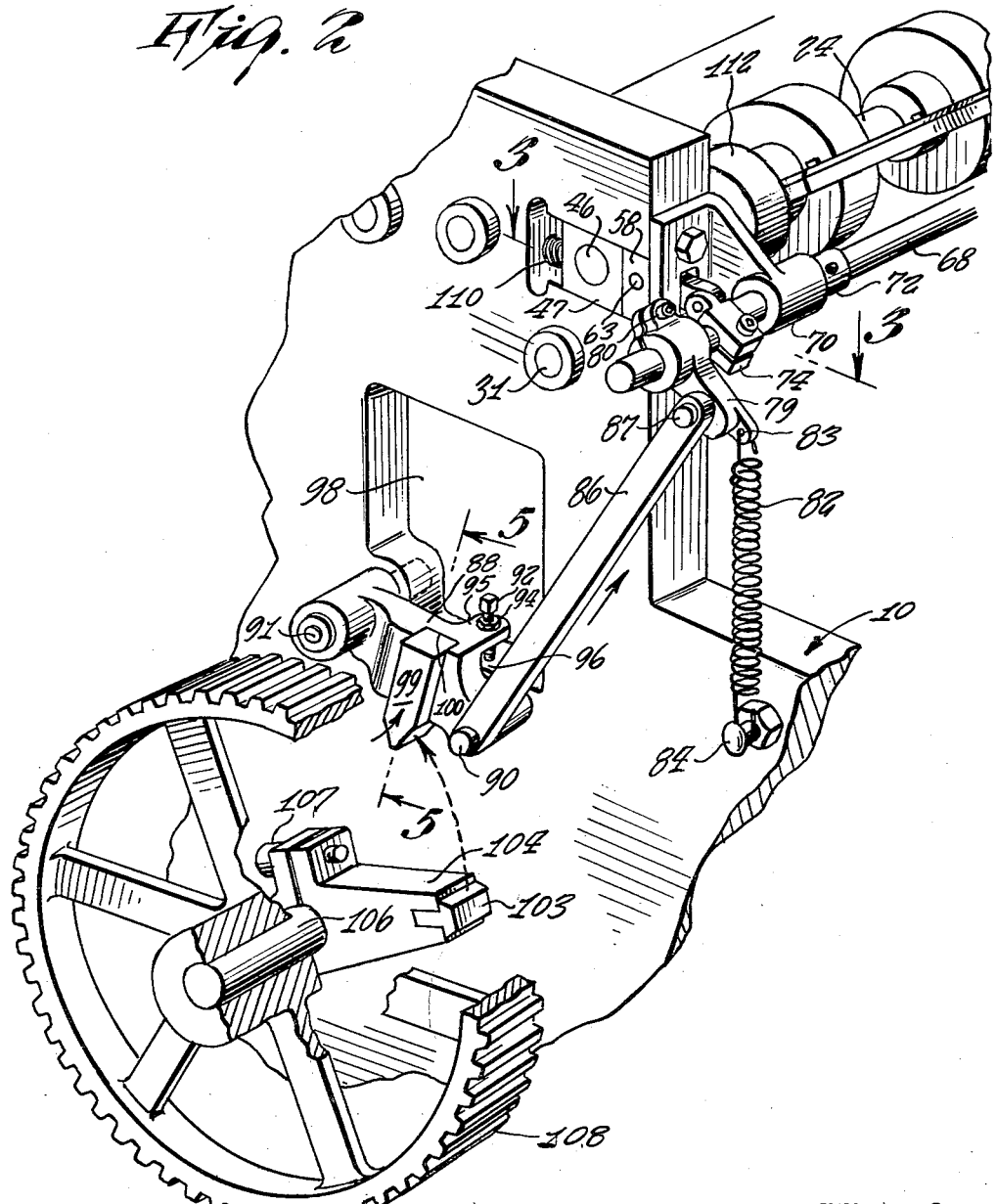

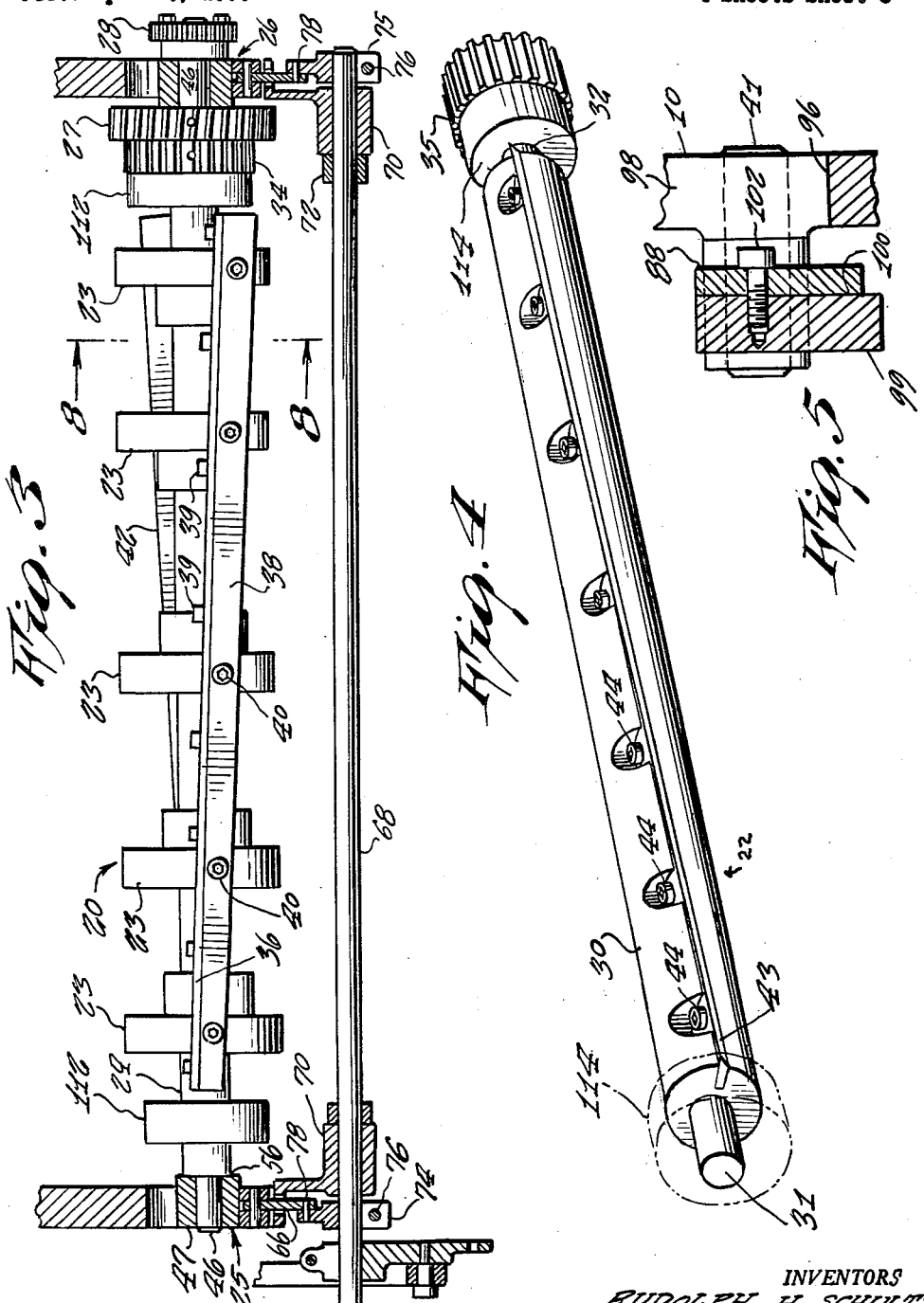

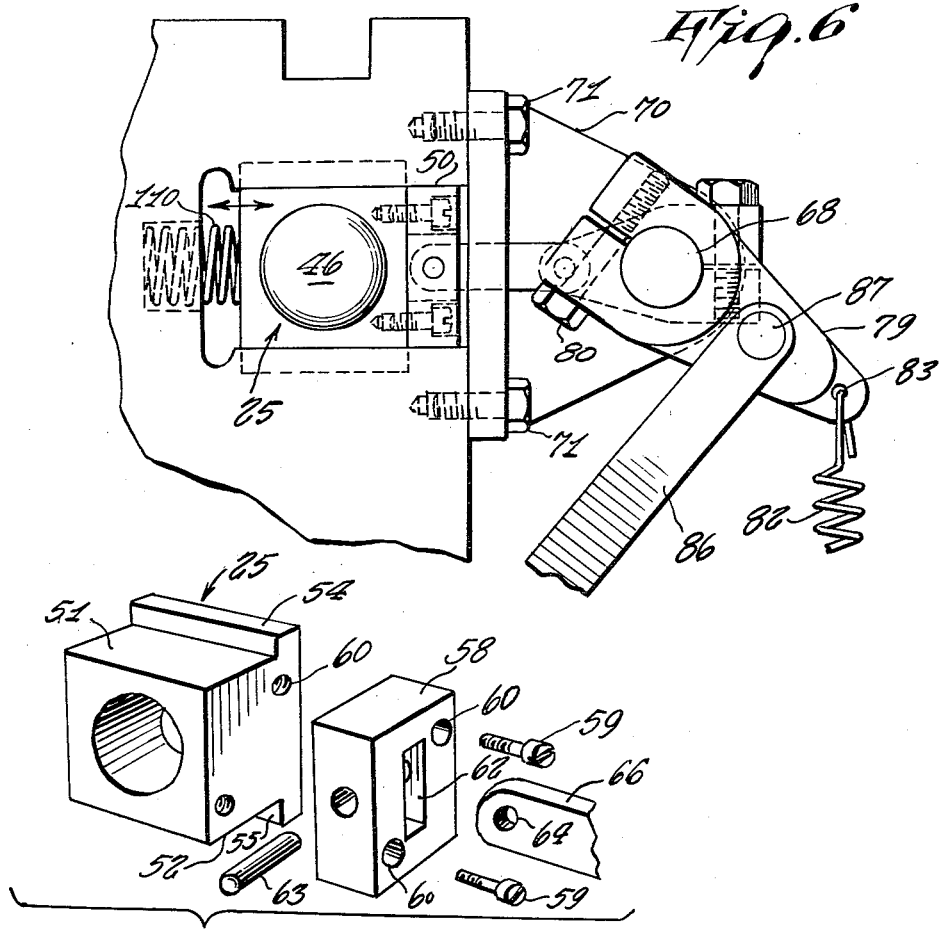
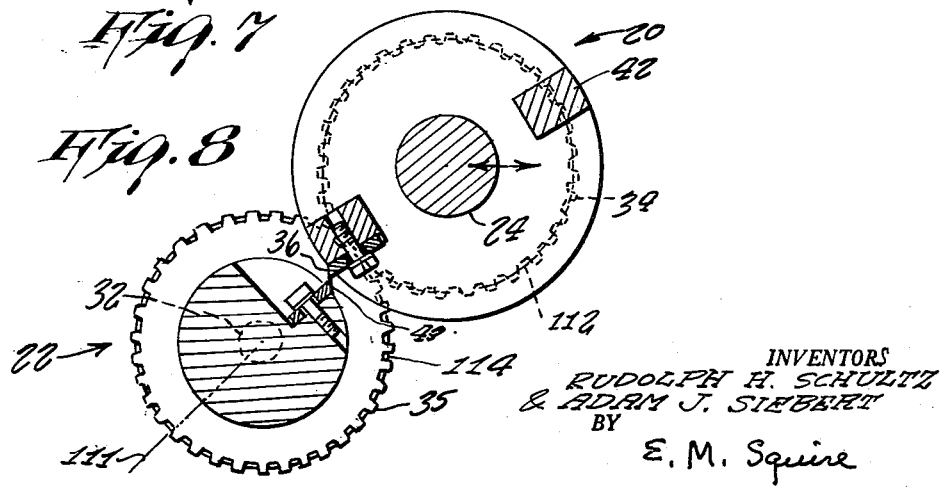

3,068,731
Patented Dec. 18, 1962

3,068,731
SHEARING APPARATUS HAVING ROTARY BEARING MEANS TO PREDETERMINE THE AMOUNT OF OVERLAP OF ROTARY BLADES
Rudolph H. Schultz, Brooklyn, and Adam J. Siebert, Flushing, N.Y. Bertha E. Siebert executrix of said Adam J. Siebert, deceased, assignors to Schultz Sales Corporation, Brooklyn, N.Y., a corporation of New York
Filed Apr. 6, 1956, Ser. No. 576,690
4 Claims. (Cl. 83—305)

The present invention relates to rotary or flying shear mechanism which is suited for severing a moving web of sheet material, and more particularly to a knife of this character wherein the web is progressively sheared across its width between two cooperating knife blades which established a longitudinally moving point contact between each other so that the moving web is severed in substantially the same manner as by a pair of scissors, yet without longitudinally stressing the moving web.

It is a principal object of the invention to provide a shear of this character which may be embodied in a machine for severing predetermined lengths from a web which is being unwound from a supply roll and moving at a relatively high speed.

Another object of the invention is to provide a rotary shear of this type in which the shear blades may selectively be separated or brought into shearing engagement while the blades are maintained in a state of continuous rotation which rotation may be at constant speed.

Still another object of the invention is the provision of bearer roller spacing means which provides an accurately predetermined amount of blade overlap or shearing action at each engagement of the continuously rotating blades.

It is a feature of the invention that the two cooperating blades are mounted on carriers which revolve at equal angular velocities, the two blades being disposed at different radial distances from the rotational axes of their respective carriers so that they move at different circumferential or tangential velocities. The two blades have different helical pitches, so dimensioned that the circumferentially faster moving blade overtakes and passes the slower blade at or in close proximity to the common axial plane of the two carriers and establishes shearing contact between the two blades at a moving point which travels lengthwise of the blades, thereby producing a true shearing action which severs the moving web progressively across its width without interfering with the linear feeding movement of the web.

Additional objects, features and advantages of the invention will become apparent upon reading the following specification together with the accompanying drawing forming a part hereof.

Referring to the drawing:
FIGURE 1 is a fragmentary perspective view of a rewinding machine embodying a rotary shear in accordance with the invention.
FIGURE 2 is a fragmentary perspective view of the machine of FIG. 1 showing a control cam which regulates operation of the shear.
FIGURE 3 is a plan view of the shear illustrated in FIGS. 1 and 2, partially shown in section taken along the line 3—3 of FIG. 2 to disclose details of the shear control mechanism.
FIGURE 4 is a perspective view of the circumferentially or tangentially slower moving knife mounted in its carrier.
FIGURE 5 is an enlarged fragmentary view, partly in section taken along the line 5—5 of FIG. 2, and showing details of a shear-actuating cam follower.
FIGURE 6 is an enlarged fragmentary elevational view showing a slidable bearing which forms a part of the shear control mechanism.
FIGURE 7 is an exploded perspective view showing one of the slidable bearings of the shear control mechanism.
FIGURE 8 is an enlarged transverse sectional view taken along the line 8—8 of FIG. 3 and showing the cooperating shear blades in engagement with each other.

Referring to FIG. 1, there is shown a fragment of a machine frame designated generally as 10 which forms a part of a rewinding machine not illustrated in detail. A web of sheet material designated 11 is shown in the process of being rewound into a series of small rolls each containing a predetermined length of web. A single partially completed small roll 12 is shown being wound on a mandrel 14 carried between a pair of progressively advanced supporting plates 15 of which only a fragment of one of the plates 15 is visible in FIG. 1 of the drawing. The web 11 passes over a guide roller 16 and then passes through the nip of a pair of spring-pressed cooperating power operated feed rollers 18 and 19. The web 11 passes from the nip of feed rollers 18, 19 to the small rewound roll 12 between upper and lower shear knife units designated generally as 20 and 22, respectively.

The upper knife unit 20 comprises a series of spaced collars 23 fixed to a shaft 24. The shaft 24 is journaled in a pair of horizontally slidable bearings designated generally as 25 and 26. The bearings 25 and 26 are mounted in the machine frame 10 as described in greater detail below. The shaft 24 carries gears 27 and 28 which mesh with other gearing (not shown) of the rewinding machine. Gear 27 receives power from the machine drive gearing of the rewinding machine and gear 28 transmits power to other parts of the rewinding machine.

The lower knife unit 22 comprises a knife carrier 30 which is provided at its ends with shaft extensions 31 and 32 (FIG. 4). The shaft extensions 31 and 32 are suitably journaled in machine frame 10. The shaft 24 of upper knife unit 20 has a spur gear 34 fixed thereon and the shaft extension 32 of lower knife unit 22 has gear 35 fixed thereon. The gears 34 and 35 are provided with identical numbers of teeth and are continuously maintained in meshing engagement with each other so that the upper and lower knife units 20 and 22 always rotate together at identical angular velocities.

The upper knife unit 20 comprises a helical shearing knife blade 36 which is fastened to a helical carrier bar 38 by a series of cap screws 39. The carrier bar 38 is secured in a series of helically arranged slots formed in the collars 23, a series of hollow head screws 40 being provided for this purpose. A counterbalancing bar 42 is disposed in a diametrically opposite helically arranged series of slots in collars 23 and serves to balance blade 36 and its carrier bar 38 and thus reduce vibration and improve the kinematic performance of the shearing mechanism.

The carrier 30 of lower knife unit 22 is helically slotted from end to end and a helical shearing knife blade 43 is secured in this slot by means of a series of screws 44.

Referring to FIGS. 3, 6 and 7, it will be seen that the shaft 24 of the upper knife unit 20 is provided with end extensions of reduced diameter at its ends as indicated at 46. The ends 46 of shaft 24 are journaled in bearing blocks 25 and 26. The bearing block 25 is horizontally slidably disposed in a slot 50 (FIG. 6) formed in the machine frame 10. Bearing block 25 comprises upper and lower guide surfaces 51 and 52, respectively, (FIG. 7) which engage the upper and lower flat horizontal edges of slot 50. Bearing block 25 is also provided with upper and lower guide flanges 54 and 55, respectively, which engage slidably against the inner face of machine frame 10 adjacent to the edges of slot 50 and retain each bearing block against outward axial movement off the reduced diameter end 46 of shaft 24. The reduced diameter portion 46 at the left hand end of shaft 24, as viewed in FIG. 3, provides a shoulder 56 which abuts against bearing block 25 and prevents leftward axial movement of knife unit 20. The gear 27 at the right hand end of shaft 24 abuts against bearing block 26 and thus prevents axial movement of knife unit 20 toward the right.

A coupling block 58 (FIG. 7) is fastened to bearing block 25 by screws 59 which are received in tapped holes 60 in the bearing block 25. A vertically extending slot 62 is formed in coupling block 58. Block 58 is traversed by a pivot pin 63 which also passes through a hole 64 in one end of a link member 66 so that link member 66 is pivotally connected to move bearing block 25 horizontally in slot 50. Bearing block 26 is similarly connected to a link member 67.

A rock shaft 68 extends across the frame 10 of the rewinding machine parallel to shaft 24 of upper knife unit 20. The rock shaft 68 is rotatably journaled in supporting brackets 70 secured to the machine frame 10 by cap screws 71. Axial movement of rock shaft 68 is prevented by collars 72 which are fixed thereon abutting the brackets 70. Crank arms 74 and 75 are adjustably clamped to rock shaft 68 by clamping screws 76. Pivot pins 78 connect the link members 66 associated with bearing blocks 25 and 26 to crank arms 74 and 75, respectively. The link members 66 and crank arms 74 and 75 operate as a toggle mechanism to press the upper knife unit 20 into positively locked operative engagement with the lower knife unit 22 as described in greater detail below.

An actuating arm 79 is adjustably clamped on rock shaft 68 by a clamping screw 80. Rock shaft 68 is yieldingly urged in a clockwise direction as viewed in FIGS. 2 and 6 by a helical tension spring 82. The upper end of spring 82 is hooked into an aperture 83 in actuating arm 79 and its lower end is anchored to a fixed stud 84 (FIG. 2) mounted on the machine frame 10. A link member 86 is pivotally connected at its upper end to actuating arm 79. The lower end of link member 86 is pivotally connected to a cam follower arm 88 by a pivot pin 90. The cam follower arm 88 is pivoted to machine frame 10 by a fixed pivot stud 91 journaled in one end of arm 88. Cam follower arm 88 is urged in a clockwise direction as viewed in FIG. 2 by the tension of spring 82 acting through link member 86. Clockwise rotation of cam follower arm 88 is limited by an adjustable stop screw 92 provided with a lock nut 94 and threaded in a laterally projecting ear 95 formed on cam follower arm 88. The lower end of stop screw 92 rests on the lower surface 96 of an aperture 98 formed in the machine frame 10. The cam follower arm 88 is provided with a pointed cam follower member 99 carried in a groove 100 formed in arm 88. The cam follower member 99 is secured in groove 100 by a screw 102 (FIG. 5). Cam follower 99 is arranged for engagement with a cam member 103 mounted at the outer end of a rotating cam arm 104. The cam arm 104 is adjustably clamped on a revolving cam shaft 106 by a clamping screw 107. The cam shaft 106 is driven by a gear 108 arranged to make one revolution for each rewound roll 12 which is completed by the rewinding machine.

Thus, each time that cam 103 engages cam follower 99, rock shaft 68 is turned counterclockwise to press bearing blocks 25 and 26 leftwardly as seen in FIG. 2 against the yielding action of a pair of compression springs 110 which individually urge each bearing block toward the right. Referring to FIG. 8, it will be seen that this movement brings the cooperating helical shearing blades 36 and 43 into shearing relationship, as shown, at the common axial plane of shafts 24 and 32 which is diagrammatically indicated by the dashed line 111. As soon as cam follower 99 is disengaged by cam 103, the bearing blocks 47 and 48 are immediately displaced toward the right, where they remain until the next actuation of cam follower 99 by cam 103. So long as the bearing blocks 25 and 26 remain displaced toward the right, although the shearing blades 36 and 43 continue to revolve at constant speed, the blades remain spaced apart when they approach each other in the course of each revolution and do not interfere with the web 11, even though the web may lightly touch either of the two spaced blades.

From FIG. 8, it will be apparent that the radial distance from the center of shaft 24 to the cutting edge of the fast blade 36 is precisely twice as great as the radial distance from the center of shaft 32 to the cutting edge of the slower blade 43. Accordingly, the circumferential or tangential velocity of blade 36 is precisely twice as great as that of the slower blade 43 and the tangential components of these different velocities normal to the plane 111 are correspondingly in a precise ratio of 2:1. It will also be observed from FIGS. 3 and 4 that the helical pitch of the faster blade 36 is precisely twice as great as the helical pitch of the slower blade 43. The helical pitch of slow blade 43 may be of the order of ¼ inch of circumferential displacement per foot of blade length (corresponding to a helix angle of about 1½° with respect to the longitudinal axis). The helical pitch of the faster blade 36 is precisely double that of the slow blade 43, or ½ inch of circumferential displacement per foot of blade length corresponding to an angle of about 3°. The two cooperating blades are relatively angularly positioned so that the leading or left hand end of fast blade 36 (FIGS. 2 and 3) engages the left hand end of slow blade 43 just as these leading ends reach the common axial plane 111. Because of its greater circumferential velocity and its greater pitch, the kinetic point of instantaneous contact between the two blades moves longitudinally along the blades and transversely of web 11 from left to right as seen in FIG. 1, and this kinetic point contact is smoothly and continuously maintained. The circumferentially faster moving blade passes the slower blade with this point contact between them. This, in turn, produces a smooth, continuous and progressive shearing engagement between the cooperating blades substantially at the common axial plane 111, so that the web 11 is smoothly sheared across its width.

The web speed may be adjusted to be equal to be circumferential speed of either one of the two blades so that it will be equal to the tangential component velocity of one blade or the other normal to the common axial plane 111. It should be noted that this kinetic point of shearing contact simultaneously has two different circumferential velocities either one of which may be used for the linear velocity of the web without producing relative movement longitudinally of the web between the web and the kinetic point of shearing engagement between the blades.

Because the kinetic point of shearing contact moves transversely across the web while longitudinal movement of the web continues, the resulting cut will necessarily be slightly on the bias. The angle of bias will be determined by the ratio between the linear velocity of the web and the linear speed with which the kinetic point of shearing engagement between the blades moves transversely across the web. Accordingly, the slower the web speed and the higher the blade speed, the less will be the angle of bias.

It has been found in practice, that the web speed need not be equal to the peripheral speed of either of the two knife blades 36 and 43. Because the two blades are in actual kinetic contact with each other at only an extremely small longitudinal portion of each blade, there is effectively only a kinetic point contact between the two blades with the point of contact moving very rapidly transversely of the web. Under these conditions, the web may be held back by the feed rollers 18 and 19 so that the linear velocity of the web 11 is slower than the tangential velocity of either the fast blade 36 or the slow blade 43 without any adverse effect. Alternatively it may be faster than the tangential velocity of either blade. In any event, as stated above, the slower the web speed with respect to the blade speed, the less will be the angle of bias of the resulting cut.

This bias may be compensated, if desired, by inclining the parallel rotational axes of the blades both at the same corrective angle with respect to a line perpendicular to the direction of web feed, which angle is equal to the angle of bias of the cut. Because of the small magnitude of this angle, the use of universal joints or the like may not be required, the usual play in the gearing being sufficient for this purpose.

In order to provide for a precise and accurately controlled amount of overlapping engagement between the blades, smooth-surfaced bearer rolls 112 are mounted on shaft 24 just beyond the ends of fast blade 36. Similar cooperating smooth-surfaced cylindrical bearer rolls 114 are mounted on shaft extensions 31 beyond the ends of slow blade 43 for lateral engagement with bearer rolls 112. The diameters of all of the bearer rolls are preferably precisely equal to each other and to the equal pitch diameters of the meshing gears 34 and 35 interconnecting the upper and lower knife units 20 and 22. Thus, when the bearing blocks 25 and 26 are forced to the left (FIGS. 2 and 6) by the toggle mechanism, the amount of travel is accurately and precisely limited by engagement of bearer rolls 112 with bearer rolls 114 and the cutting edges of the shearing blades, as they engage each other, will have an accurately predetermined amount of mutual overlap. The amount of travel of the bearing blocks 25 and 26 toward the right (FIGS. 2 and 6) is large enough to prevent shearing cooperation between the knife blades 36 and 43 but is small enough so that the gears 34 and 35 remain continuously in meshing engagement with each other. The pressure of bearer roll engagement, which is determined in part by the toggle action of link members 66, 67 and crank arms 74, 75 may be adjusted by the insertion of shims between one of the coupling blocks 58 and its associated bearing block 25 or 26 or both.

In operation, the gearing which drives cam shaft 106 is so arranged by the use of change gears or the like, that cam 103 actuates cam follower 99 for only a portion of a single common revolution of the upper and lower knife units 20 and 22. This portion of a single revolution is adjusted to begin prior to the time that the shearing blades 36 and 43 reach their initial position for mutual engagement and to terminate before they next reach this position. They must be held continuously engaged, however, throughout the complete shearing operation in order that the web may be completely severed. In order to permit convenient adjustment of the interval of blade engagement with respect to different predetermined lengths of web to be severed, the cam 103 may be readily replaced by a different cam of appropriately greater or lesser arcuate length as circumstances may require.

While the embodiment of the invention hereinabove illustrated uses a ratio of 2:1 for the radial distances from the cooperating shearing edges to their respective rotational axes, ratios other than those specifically disclosed may similarly be used. In any event, the helical angles of the two blades, whether measured in degrees of angular inclination with respect to their individual rotational axes, or in terms of circumferential displacement per unit of blade length, must be as nearly precisely as manufacturing limitations will permit, exactly proportional to the radial distance of each blade from its rotational axis, or to the circumferential speed of each blade if the blades should be driven at different angular velocities.

In this connection, it should be appreciated that the gearing 34, 35 may be arranged to provide a 2:1 ratio of angular velocities and the helical blades placed at equal radial distances from their respective axes. In such case, the counterbalancing bar 42 may be provided with a knife blade and upper knife unit 20 driven at slow speed so that the single fast blade will be engaged once during each revolution of its carrier alternately by the two slow blades. Alternatively, single blades may be used, as shown, which engage each other only during alternate revolutions of the faster blade. Other ratios such as 5:4 may be used for the relative angular velocities, four blades being mounted on the slow carrier and five blades on the fast carrier, for example. In every case, however, the circumferential speed-pitch ratio for both cooperating blades must be the same in order to achieve a point contact between the blades which moves transversely completely across the web.

We have shown what we believe to be the best embodiments of our invention, it will be apparent to those skilled in the art that many changes and modifications may be made therein within the spirit and scope of the invention as defined in the appended claims.

What is claimed is:

1. A rotary shear of the class described, comprising a plurality of revoluble knife carriers having spaced parallel axes of rotation, at least one helical cutting blade carried by each carrier coaxially with the rotational axis thereof, said blades having different helical pitches in opposite directions for shearing engagement with each other, continuously operative means for driving said carriers to impart constant different circumferential velocities to said blades, said velocities being proportional to said respective pitches, laterally interengageable smooth-surfaced cylindrical bearer roller means of equal diameters each coaxial with the rotational axis of one of said carriers, said roller means being disposed beyond the ends of said blades, said roller means limiting the maximum amount of overlap between said blades when said blades are in shearing engagement with each other, and means for causing engagement between two blades carried by different ones of said carriers substantially at the common axial plane thereof, whereby the circumferentially faster moving blade passes the slower blade with effectively point contact between said blades and a web of material passing between said engaging blades will be progressively sheared across its width, wherein said means for causing engagement between said two blades comprises means supporting said carriers for relative movement of at least one carrier toward and away from the other with said axes remaining parallel, the movement of said carriers toward each other being limited by engagement of said roller means with each other.

2. A rotary shear of the class described comprising two revoluble knife carriers having spaced parallel axes of rotation, continuously operative means for rotating said carriers at equal angular velocities, and two cooperating helical blades each carried by one of said carriers, the cutting edges of said blades being disposed at different uniform radial distances from the rotational axes of their respective carriers, the helical pitch of each blade being proportional to its radial distance from the rotational axis of its respective carrier, the leading ends of said blades being positioned to engage each other substantially at the plane defined by said rotational axes with effectively point contact between said cutting edges, the location of said point contact moving longitudinally of said blades from said leading ends to the trailing ends thereof with the cutting edge which is disposed at a greater radial distance passing the other cutting edge at said longitudinally moving location of point contact, laterally interengageable smooth-surfaced cylindrical bearer roller means of equal diameters each coaxial with the rotational axis of one of said carriers, said roller means being disposed beyond the ends of said blades, said roller means limiting the maximum amount of overlap between said blades when said blades are in shearing engagement with each other, and means for holding said roller means pressed into engagement with each other during shearing engagement between said blades, wherein one of said carriers is disposed for relative movement with respect to the other carrier with said axes remaining parallel, whereby said edges may be maintained spaced apart when they would otherwise enter into shearing engagement with each other.

3. A rotary shear of the class described, comprising a machine frame; two revoluble knife carriers disposed in said frame with spaced parallel axes of rotation; at least one helical knife carried by each carrier, the cutting edges of the knives carried by different carriers being disposed at different uniform radial distances from the rotational axes of their respective carriers, the helical pitch of each blade being proportional to its radial distance from the rotational axis of the carrier by which it is carried; bearing means carried by said frame and supporting one of said carriers for selective movement toward and away from the other carrier with said axes maintained parallel; continuously operative drive means for driving said carriers at constant equal angular velocities to produce shearing cooperation between said knives when said one carrier is moved toward the other, said knives remaining spaced apart when said one carrier is moved away from the other; driven web feeding means for moving a web of material between said carriers to be sheared by said knives; cyclically operative means driven with said web feeding means and connected with said bearing means for moving said one carrier toward the other when a predetermined length of web has been fed between said carriers, said cyclically operative means comprising means for holding said one carrier moved toward the other during the entirety of said shearing engagement between said knives and means for moving said one carrier away from the other prior to the time when the next successive shearing engagement would otherwise take place, and laterally interengageable smooth-surfaced cylindrical bearer roller means each coaxial with the rotational axis of one of said carriers, said roller means being disposed beyond the ends of said knives, said roller means, when in engagement with each other, providing a predetermined amount of overlap between said knives during the course of said shearing cooperation, movement of one carrier toward the other by said cyclically operative means being limited by engagement between said roller means.

4. A rotary shear of the class described, comprising a machine frame; two revoluble knife carriers disposed in said frame with spaced parallel axes of rotation; at least one knife carried by each carrier; bearing means carried by said frame and supporting one of said carriers for selective movement toward and away from the other carrier with said axes maintained parallel; means for driving said carriers to produce shearing cooperation between said knives when said one carrier is moved toward the other, said knives remaining spaced apart when said one carrier is moved away from the other; driven web feeding means for moving a web of material between said carriers to be sheared by said knives; cyclically operative means driven with said web feeding means and connected with said bearing means for moving said one carrier toward the other when a predetermined length of web has been fed between said carriers, said cyclically operative means comprising toggle means for holding and locking said one carrier moved toward the other during the entirety of said shearing engagement between said knives and means for moving said one carrier away from the other prior to the time when the next successive shearing engagement would otherwise take place; and a plurality of cooperating bearer roller means disposed concentrically with respect to each of said axes, said bearer roller means being locked in engagement with each other by said toggle means during said shearing engagement for maintaining a predetermined constant amount of overlap of one knife over the other during the entire course of said shearing engagement.

References Cited in the file of this patent
UNITED STATES PATENTS

| | | |
|---|---|---|
| 391,949 | Cottrell | Oct. 30, 1888 |
| 1,814,867 | Swift | July 14, 1931 |
| 1,859,336 | MacChesney et al. | May 24, 1932 |
| 1,966,525 | Schultz et al. | July 17, 1934 |
| 1,984,913 | Biggert | Dec. 18, 1934 |
| 2,026,533 | Haupt | Jan. 7, 1936 |
| 2,146,274 | Stern et al. | Feb. 7, 1939 |
| 2,288,921 | Rosenleaf et al. | July 7, 1942 |
| 2,288,922 | Rosenleaf et al. | July 7, 1942 |
| 2,299,650 | Parks et al. | Oct. 20, 1942 |
| 2,345,072 | Rosenleaf et al. | Mar. 28, 1944 |
| 2,642,938 | Hallden | June 23, 1953 |